US006697328B1

(12) United States Patent
Briem

(10) Patent No.: US 6,697,328 B1
(45) Date of Patent: Feb. 24, 2004

(54) PROCESS FOR OPTIMIZING LOAD DISTRIBUTION BETWEEN CONNECTION SECTIONS OF DATA PACKAGE TRANSMISSION SYSTEMS

(75) Inventor: Uwe Briem, Maisach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/230,221
(22) PCT Filed: Jul. 16, 1997
(86) PCT No.: PCT/DE97/01501
§ 371 (c)(1),
(2), (4) Date: Jan. 21, 1999
(87) PCT Pub. No.: WO98/06231
PCT Pub. Date: Feb. 12, 1998

(30) Foreign Application Priority Data

Jul. 31, 1996  (DE) .......................... 196 30 919

(51) Int. Cl.[7] .............................................. G01R 31/08
(52) U.S. Cl. ................... 370/235; 370/395.4; 370/414; 370/418
(58) Field of Search .............................. 370/230, 230.1, 370/231, 232, 233, 235, 395.1, 395.4, 395.41, 429, 391, 389, 392, 412, 413, 414, 417, 418

(56) References Cited

U.S. PATENT DOCUMENTS

| 5,533,020 A | * | 7/1996 | Byrn et al. ............. 370/395.4 |
| 5,734,650 A | * | 3/1998 | Hayter et al. ............. 370/391 |
| 5,748,614 A | * | 5/1998 | Wallmeier ............. 370/395.41 |
| 5,793,747 A | * | 8/1998 | Kline ............. 370/230 |
| 6,262,986 B1 | * | 7/2001 | Oba et al. ............. 370/399 |

FOREIGN PATENT DOCUMENTS

EP  0 705 007 A2  3/1996

OTHER PUBLICATIONS

International Journal of Communication Systems, vol. 7, (1994), J.W. Roberts, "Virtual spacing for flexible traffic control", pp. 307–318.
Proceedings of the 1996 IEEE 15th Annual International Phoenix Conference on Computers and Communications, K. Park, Self–Organized Multi–Class QoS Provision for ABR Traffic in ATM Networks, pp. 446–453.

* cited by examiner

Primary Examiner—Douglas Olms
Assistant Examiner—Bob A. Phunkulh
(74) Attorney, Agent, or Firm—Fish & Richardson

(57) ABSTRACT

A method, for use with systems that transmit information in data packets, includes running a first scheduling method on at least one first-stage scheduler device which guarantees first connection parameters during a transmission process. The first connection parameters correspond to transmission rates for the data packets. The method also includes storing a queue identifier in packet headers of the data packets and determining to run, based on the queue identifier, a second scheduling method on a second-stage scheduler device which limits second connection parameters during the transmission process. The second connection parameters correspond to higher transmission rates for the data packets than the first connection parameters and precedes the first scheduling method. The method further includes bypassing the first scheduling method when the transmission rates are not to be limited.

12 Claims, 3 Drawing Sheets

PROCESS FOR OPTIMIZING LOAD DISTRIBUTION BETWEEN CONNECTION SECTIONS OF DATA PACKAGE TRANSMISSION SYSTEMS

BACKGROUND OF THE INVENTION

The invention relates to a method for optimizing the use of connected sections in a system for transmitting data pockets.

In modern packet switching systems, information is transmitted in data packets. One example of this is ATM cells. These have a header part and an information part. The header part is used to store connection information, and the information part to store the wanted data to be transmitted. As a rule, the actual transmission takes place via connecting sections between the transmitter and receiver. In this case, there may be a requirement to utilize the connecting sections in such a manner that a plurality of transmitting devices transmit the cell streams originating from these devices via the same connecting section.

In order to allow the transmission of the respective cell streams to be carried out in accordance with the requirements of the individual cell streams, a so-called WEIGHTED FAIR QUEUING SCHEDULING method has become generally accepted in the prior art. The corresponding relationships are described, for example, in the document "Virtual Spacing for Flexible Traffic Control", J. W. Roberts, International Journal of Communication Systems, Vol. 7, 307–318 (1994). In this case, the individual cell streams are assigned different weighting factors, which are used to control the actual transmission process on the individual connecting sections. Reference should be made to FIG. 3 to assist understanding.

By way of example, this shows cell streams 1 . . . n. The n cell streams are passed from a transmitting device DEMUX in the direction of one or more receivers. In practice, only one common connecting section is used in this case. The n cell streams are furthermore assigned weighting factors $r_1 \ldots r_n$. To assist understanding, it is assumed that it is intended to pass only two cell streams, namely the cell streams 1, 2, via a connecting section. The connecting section is furthermore intended to have a maximum transmission capacity of 150 Mbit/s. The two cell streams 1 and 2 are assigned weightings $r_1=2$ and $r_2=1$. This results in the cell stream 1 being transmitted at a transmission rate of 100 Mbit/s, and the cell stream 2 at only 50 Mbit/s, if cells for both cell streams are present for transmission. If only one of the two cell streams has cells to transmit, this cell stream is assigned the total transmission capacity of 150 Mbit/s.

FIG. 2 shows how the theoretical considerations addressed above are implemented in practice in the prior art. This shows how data packets, or ATM cells, are dealt with using the weighted fair queuing scheduling algorithm. In this case, incoming cells are supplied to the input device EE, are passed on to the demultiplexing device DEMUX and are stored there with the aid of a demultiplexing function, which is implemented here, and with the assistance of a queue identifier QID in a logic queue. The queue identifier QID is in this case contained in the cell header of each cell.

At the same time, control data which are determined in the input device EE are for this purpose supplied to a scheduler device S. A scheduling algorithm which is known per se is executed in this device. This may be, for example, the weighted fair queuing scheduling algorithm or any other algorithm. This algorithm determines, for example, the sequence in which or the time at which it is intended to read the cells which are stored in the buffer stores P1 . . . Pn (initial planning). The result of the assessment of the control data by this algorithm is supplied to the output device AE. The cells stored in the buffer stores P1 . . . Pn are now read, on the basis of the result of the assessment, by the algorithm which is being executed in the scheduling device S. Furthermore, an acknowledgment signal is fed; back to the input device EE. After this and when a new cell with a queue identifier QID arrives in the input device EE and when an acknowledgment 'selected QID' is present, the input device EE uses the buffer filling level for QID=I as well as the scheduling method to decide whether the message "SCHEDULE QID" is generated. This message indicates to the scheduler device S that it should carry out initial planning for the next transmission time for this queue identifier QID, in some way.

A problematic feature of such a procedure is that, although the weighted fair queuing scheduling algorithm guarantees minimum cell rates, a maximum cell rate limiting cannot be carried out here. However, this is a major factor since, in practice, both minimum and maximum cell rates often have to be complied with—for example in the case of ABR (available bit rate) traffic.

European Patent Application EP 0 705 007 A2 describes a method for guaranteeing maximum and minimum cell rates. In this case, the scheduling of the cells is carried out on a cell basis, one scheduler being used first to ensure the minimum cell rate, and a scheduler then being used to limit the peak cell rate.

SUMMARY OF THE INVENTION

The invention is based on the object of providing a weighted fair queuing scheduling algorithm that is modifiable such that optimized transmission is ensured.

In general terms the present invention is a method for optimization of the utilization of connecting sections in systems in which information is transmitted in data packets. A scheduling method runs on a scheduler device by which connection parameters, which are representative of lower transmission rates of the data packets, are guaranteed during the transmission process. A queue identifier is stored in the packet header. Based on the queue identifier, the scheduling method running on the scheduler device may possibly be preceded by a further scheduling method running on a further scheduler device, by which the connection parameters which are representative of upper transmission rates of data packets are limited during the transmission process. There may be more than one scheduler device while there is only one further scheduler device.

An advantageous feature of the invention is that, based on a queue identifier contained in the packet header, the scheduling method running on a scheduler device may possibly be preceded by a further scheduling method running on a further scheduler device, by means of which the connection parameters which are representative of upper transmission rates of data packets are limited during the transmission process, in which case there may be more than one scheduler device, while there is only one further scheduler device. In this case, the result from the first stage is used as the input signal for the second stage. This results in both an upper and a lower cell-rate limit being controllable, that is to say the cells are not transmitted at higher cell rates during the transmission process. In particular, this method is not limited to the use of a specific algorithm. Furthermore, it should be also be mentioned that two scheduler devices are provided, there being only one of the first of these scheduler devices, while there may advantageously be more than one of the remaining one of the scheduler devices.

Advantageous developments of the present invention are as follows.

The scheduling method is a weighted fair queuing scheduling algorithm. This is linked to the advantage that a proven method can be used. A further advantage of this is that this algorithm guarantees lower limiting of the cell rate.

An input device containing a table which contains the current filling levels of the buffer stores. This is linked to the advantage that a current map of these filling levels is stored here at all times.

Depending on control data obtained from the scheduler device, the output device takes cells from at least one of the buffer stores and acknowledges this process to the input device. As a result of the feedback, the reading process has a direct influence on the first stage of the two-stage method. The two stages of the two-stage scheduling method thus do not operate independently of one another. The way in which the first stage operates is influenced by the way in which the second stage operates. The queue identifier or the packet length may be used, for example, as feedback parameters.

The queue identifier is entered while the connection is being set up.

The data packets are ATM cells. The invention can thus be applied in particular to ATM networks.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
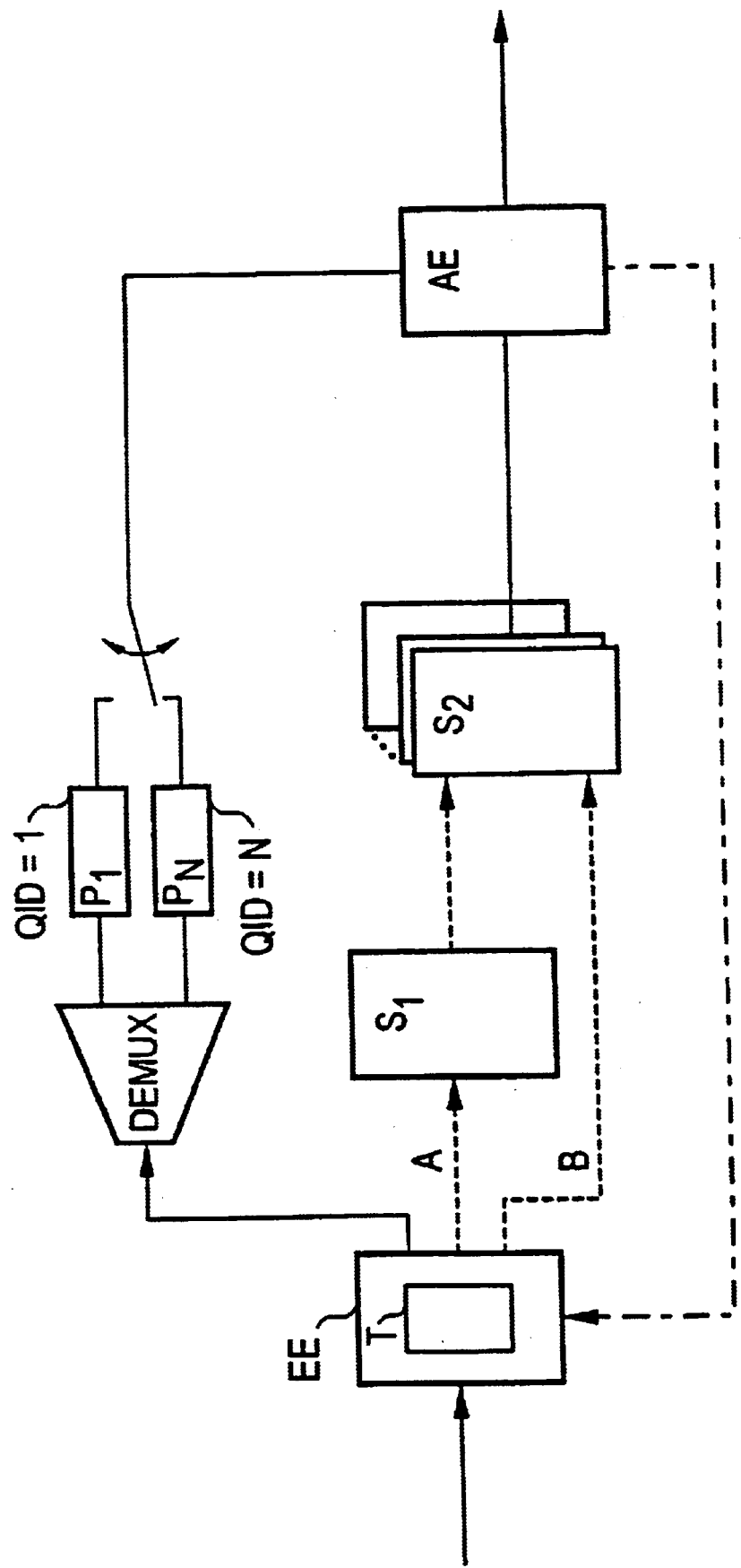
FIG. 1 shows the method according to the invention.
Figure 2:
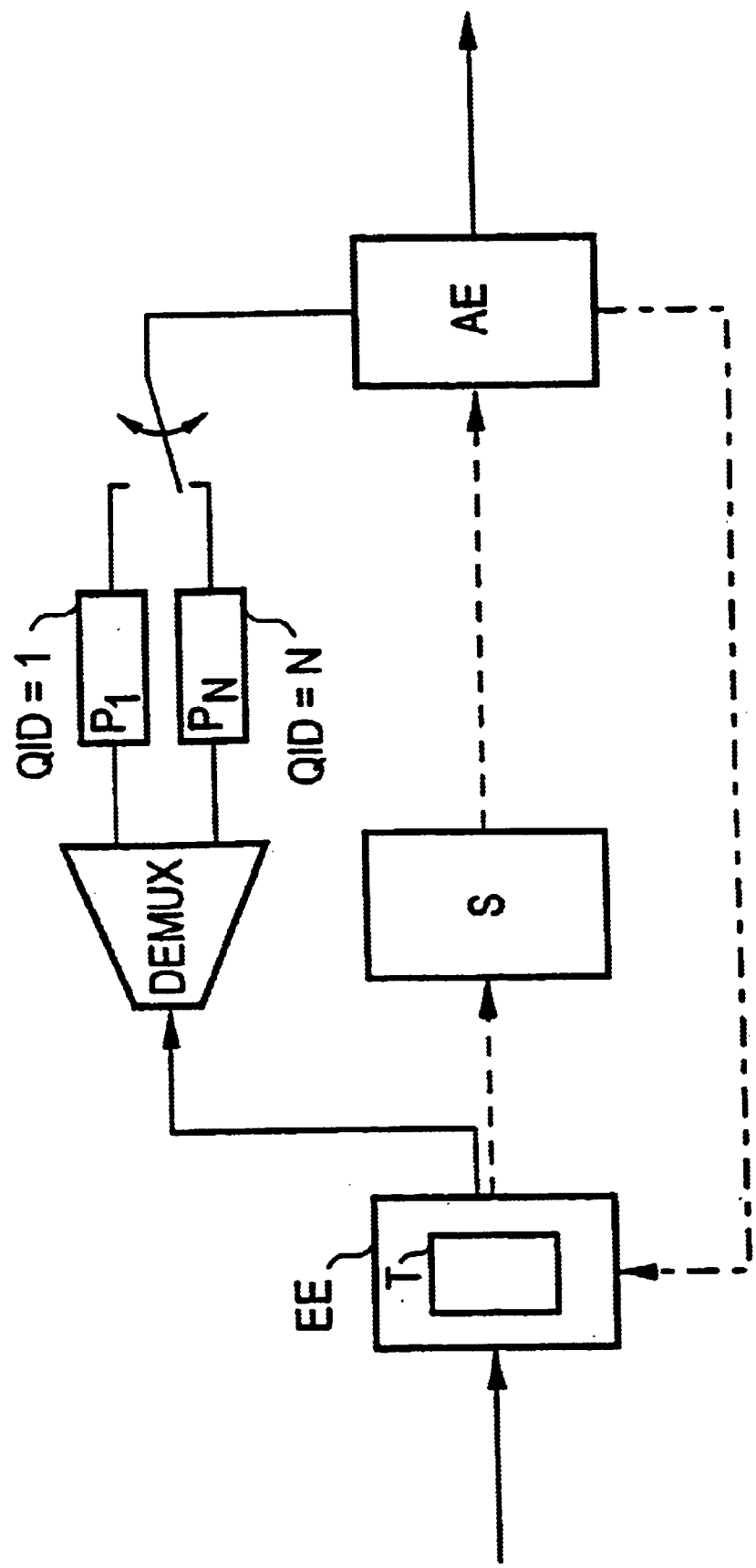
FIG. 2 shows the practical application of the prior art.
Figure 3:
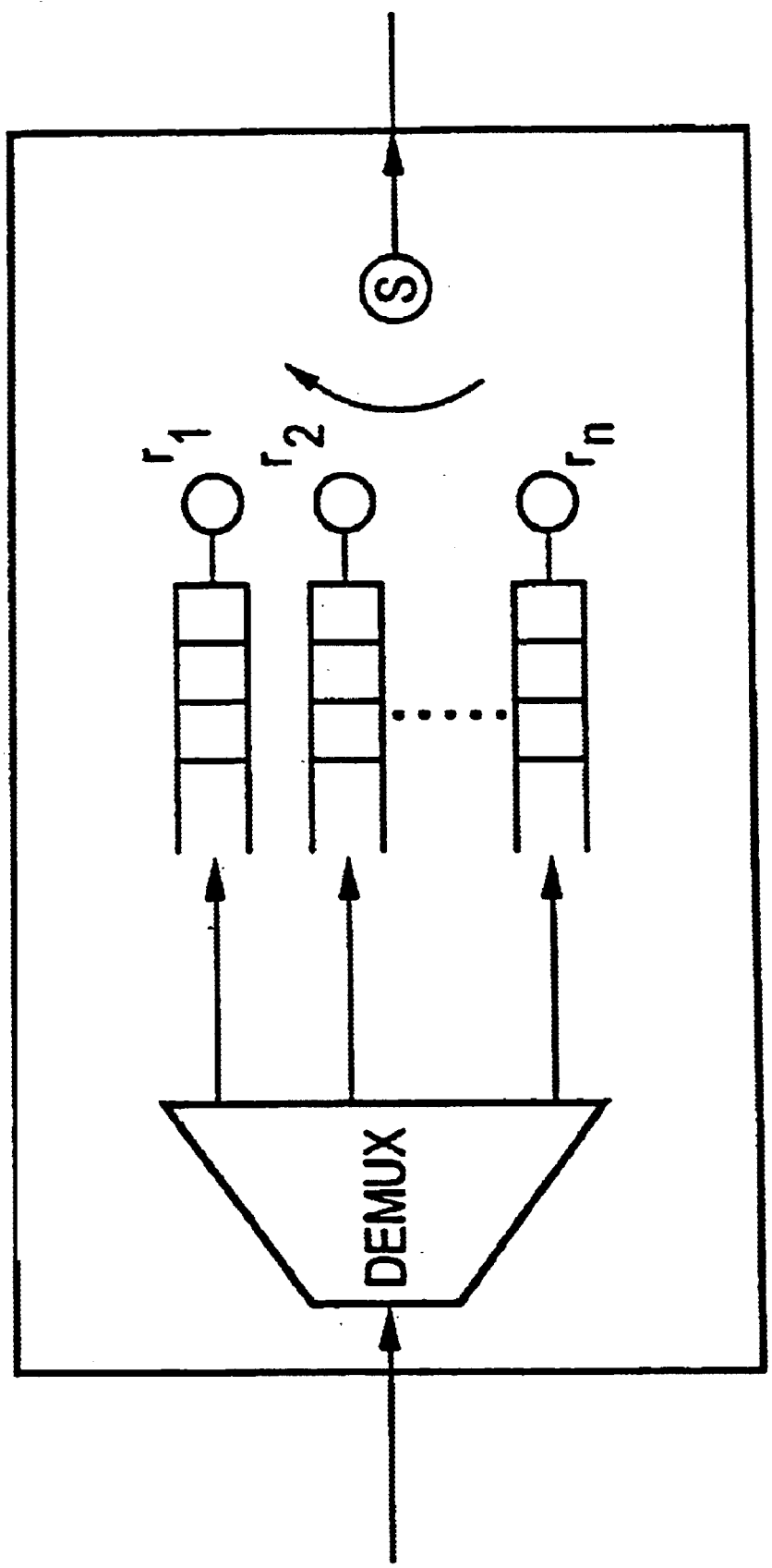
FIG. 3 shows theoretical considerations relating to the prior art.

FIG. 1 shows the method according to the invention. In this case, it is assumed that the information is transmitted in ATM cells, using an asynchronous transfer method (ATM).

The cells are supplied to the input device EE in a cell stream. The routing information is stored in the header part of each cell. Furthermore, a queue identifier QID has been stored here while the connection is being set up. This queue identifier is a cell stream identifier which is entered in the cell header on a connection-specific basis or for a group of connections. As a rule, the queue identifier QID is assigned simple numerical values. In the present exemplary embodiment, the queue identifier QID is intended to have the values 1 ... N. Originating from the input device EE, the cells themselves are supplied to the demultiplexing device DEMUX where they are written into buffer stores P1 ... Pn, designed as logic queues, with the aid of a demultiplexing function, which is implemented here, and with the assistance of the queue identifier QID.

The input device EE furthermore contains a table T as to which of the connections require the connection parameters to be limited during the transmission process. In the present exemplary embodiment, it is assumed that limiting of the cell rate is controlled in the sense of limiting the connection parameters. In order to verify the connection, the queue identifier QID is taken from each of the incoming cells and is compared with the entries in the table T.

If it is not intended to limit the cell rate for a connection, corresponding control data are supplied via the connecting section B to the scheduler device $S_2$, bypassing the scheduler device $S_1$. There, the control data are used in a scheduling algorithm which is known per se. In the present exemplary embodiment, this is intended to be weighted fair queuing scheduling method, which has already been described in the introduction. Such an algorithm results in a lower cell rate being guaranteed, in the sense of guaranteeing the connection parameters of the cells during the transmission process.

According to the present exemplary embodiment, the cell rate for one of the connections is limited, for example for the connection with the number 8 (QID=8). In this case, the control data are supplied via the connecting section A to the scheduler device $S_1$. Here, an algorithm starts to be executed, which controls an upper limit on the cell rate. This is done by a function implemented here using the queue identifier QID for initial planning of the control data supplied from the input device EE, such that the individual cells do not exceed a predetermined rate. At the time at which the scheduler device $S_1$ would read a cell, it produces, however, a control signal itself for initial planning of the read time, corresponding to the general scheduling algorithm being executed in the scheduler device $S_2$. No initial planning of the next event takes place in the scheduler device $S_1$, for the same queue identifier QID. Thus, stimulated by the scheduler device $S_1$ the scheduler device $S_2$ plans the sequence for the indicated queue identifier QID, corresponding to the scheduling algorithm being executed here. The cells initially planned by the scheduler device $S_1$ may thus experience an additional delay. The peak bit rate set in the scheduler device $S_1$ may thus be different from that used to read the cells.

By way of example, the weighted fair queuing scheduling algorithm is intended to be used in the scheduler device $S_2$ in the present exemplary embodiment, although other algorithms can also be used. The method according to the invention is not, however, limited to the use of a specific algorithm.

The result, of the evaluation of the algorithm being executed in the scheduler device $S_2$ is passed to the output device AE. Whenever it is intended to read the next cell from a buffer store P1 ... Pn with a specific queue identifier QID, this is indicated to the output device AE. This reads the first cell with the indicated queue identifier QID from the buffer store P1 ... Pn in question, and reports this together with the corresponding queue identifier QID to the input device EE. The latter then checks whether a further cell with this QID is stored in the buffer store. If this is the case, a corresponding signal (SCHEDULE QID) is sent to the scheduler device $S_1$. If this is not the case, no further action takes place in the sense of initial planning (reading) in the scheduler device $S_1$ for this queue identifier QID.

This method means that an event for a queue identifier QID can be initially planned only in the scheduler device $S_1$ or $S_2$, but not at the same time in both devices. Furthermore, the two function blocks $S_1$ and $S_2$ are not linked to a specific implementation. This two-stage algorithm is thus used to determine the sequence in which and the time at which it is intended to read the cells which are stored in the buffer stores P1 ... Pn.

Furthermore, it should also be mentioned that there is only one scheduler device $S_1$, but there may be more than one scheduler device $S_2$. Since the first stage of the two-stage method runs on the scheduler device $S_1$, in consequence it is carried out only once. The second stage of the two-stage method runs on the scheduler device $S_2$ In consequence, if there is more than one scheduler device $S_2$, the second method stages are carried out on the respectively associated scheduler device $S_2$—that is say more than once.

Finally, it should also be mentioned that the above exemplary embodiment has been described using the example of ATM cells. However, the invention is not just limited to this. The method according to the invention can likewise be used for the transmission of information in data packets as such. However, in this case it is necessary to ensure that the packet length is added to the control data.

DESCRIPTION OF THE PREFERRED EMBODIMENTS

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for use with systems that transmit information in data packets, comprising:

running a first scheduling method on at least one first-stage scheduler device which guarantees first connection parameters during a transmission process, the first connection parameters corresponding to transmission rates for the data packets;

storing a queue identifier in packet headers of the data packets;

determining whether to run, based on the queue identifier, a second scheduling method on a second-stage scheduler device which limits second connection parameters during the transmission process, the second connection parameters corresponding to higher transmission rates for the data packets than the first connection parameters, the second scheduling method preceding the first scheduling method; and bypassing the second scheduling method when the transmission rates for the data packets are not to be limited.

2. The method as claimed in claim 1, wherein the first scheduling method comprises a weighted fair queuing scheduling algorithm.

3. The method as claimed in claim 1, wherein an input device contains a table which contains current filling levels of buffers for the data packets.

4. The method as claimed in claim 3, further comprising:

obtaining control data from the at least one first-stage scheduler device; and using an output device to take data packets from at least one of the buffers and acknowledging said taking to the input device.

5. The method as claimed in claim 1, wherein the queue identifier is stored while a connection is being set up.

6. The method as claimed in claim 1, wherein the data packets comprise ATM cells.

7. A system for transmitting information in data packets, comprising:

a first-stage scheduler device to run first scheduling method which guarantees first connection parameters during a transmission process, the first connection parameters corresponding to transmission rates for the data packets; and a second-stage scheduler device to determine whether to run a second scheduling method based on a queue identifier stored in packet headers of the data packets, the second scheduling method limiting second connection parameters during the transmission process, the second connection parameters corresponding to higher transmission rates for the data packets than the first connection parameters, the second scheduling method preceding the first scheduling method;

wherein the second scheduling method not run when the transmission rates for the data packets are not to be limited.

8. The system of claim 7, wherein the first scheduling method comprises a weighted fair queuing scheduling algorithm.

9. The system of claim 7, further comprising:

an input device comprising a table having current filling levels of buffers for the data packets.

10. The system of claim 9, further comprising:

an output device for taking cells from at least one of the buffers and acknowledging said taking to the input device;

wherein control data is obtained from the at least one first-stage scheduler device.

11. The system of claim 7, wherein the queue identifier is stored in packet headers of the data packets while a connection is being set up.

12. The system of claim 7, wherein the data packets comprise ATM cells.

* * * * *